March 17, 1931. C. J. BRISTOL 1,796,557
WHEEL STOP DEVICE FOR AUTOMOBILE LIFTS
Filed July 30, 1929
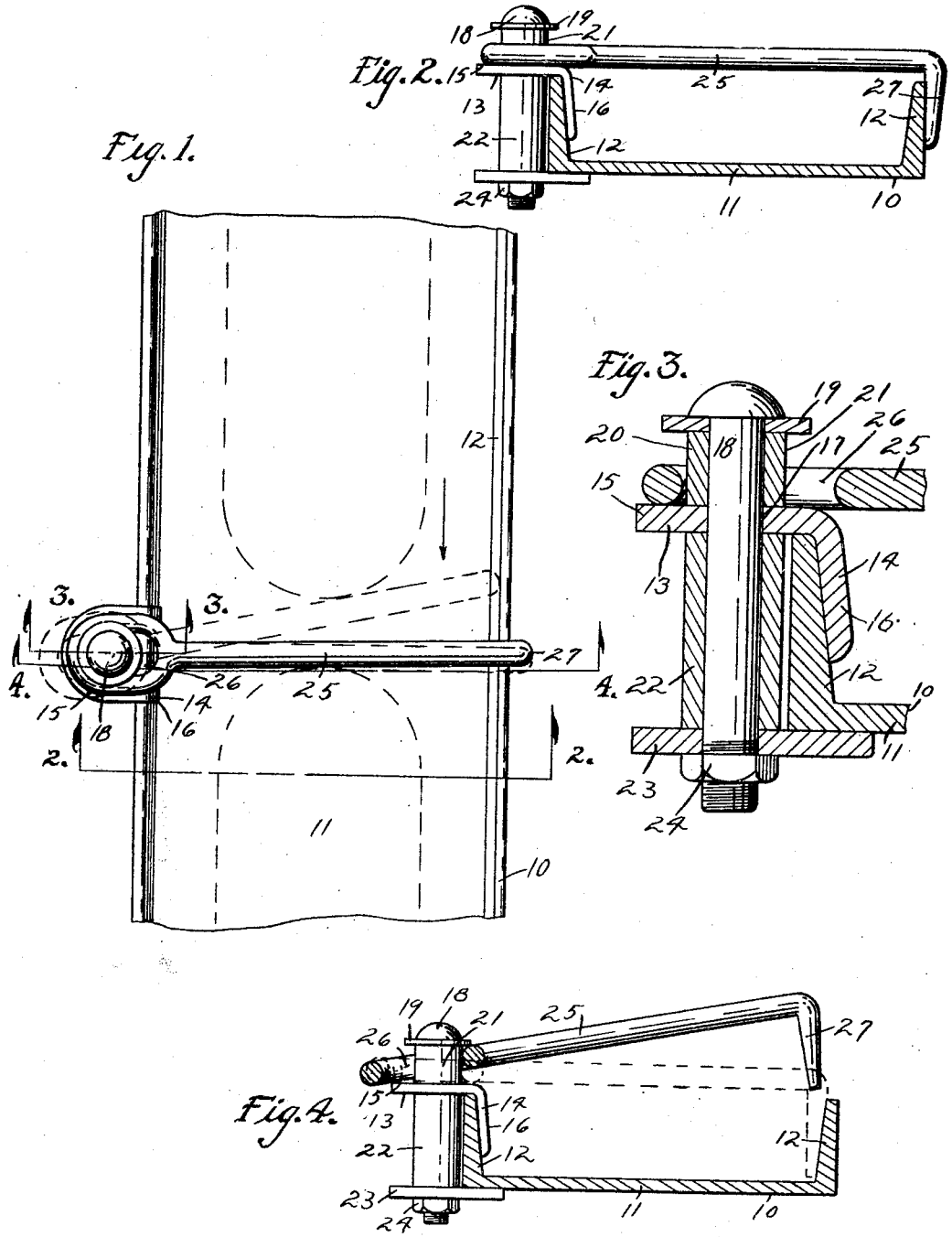
Inventor
Cyrus J. Bristol
per
Owing & Hague Att'ys Patented Mar. 17, 1931

1,796,557

UNITED STATES PATENT OFFICE

CYRUS J. BRISTOL, OF DES MOINES, IOWA, ASSIGNOR TO GLOBE MACHINERY & SUPPLY COMPANY, OF DES MOINES, IOWA, A CORPORATION OF IOWA

WHEEL STOP DEVICE FOR AUTOMOBILE LIFTS

Application filed July 30, 1929. Serial No. 382,232.

The object of my invention is to provide a wheel stop of simple, durable and inexpensive construction, which may be easily and quickly applied to the runways of automobile lifts, and when so applied will be positive in its action, and at the same time easily and quickly moved to an open or closed position.

A further object is to provide a wheel stop of the class above described which is particularly adapted to be used in connection with that type of runways formed of inverted channel bars, and having a clamp device so arranged that the stop may be moved longitudinally of the channel bars or runways to adjust the stop to automobiles of various lengths, and also provided with means whereby the stop may be easily and quickly applied without the use of any tools other than a wrench and without drilling or in any other manner altering the construction of the runways.

A further object is to provide a wheel stop which may be applied to operate adjacent to either the front or back faces of the wheels when in said runways, or which may be applied to either the inner or outer flanges of the channel bar.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top view of a portion of a wheel runway such as used on automobile lifts, and showing the manner in which my improved stop is applied thereto.

Figure 2 is a detail sectional view taken on the line 2—2 of Figure 1.

Figure 3 is a detail sectional view taken on the line 3—3 of Figure 1.

Figure 4 is a detail sectional view taken on the line 4—4 of Figure 1, showing the stop device in a partially open position.

I have used the reference numeral 10 to indicate one of the runways of an automobile lift. Said runway comprises a channel bar having a web portion 11, which serves as a floor for the wheels to rest upon, and upwardly projecting flanges 12, which serve as guides for the wheels. Each automobile lift is usually provided with a pair of these runways spaced apart a distance to correspond to the transverse distance between the wheels.

The runways are of such length that one set of the side wheels will rest in one of the runways and the other set in the other runway. The ends of the runways usually project some distance beyond the front and back edges of the wheels.

Secured to one of the flanges 12 of each of the runways, near each of its ends, is a clamp device 13, comprising an angle plate 14 having a horizontal flange 15 and a downwardly and inwardly inclined flange 16. Said flange 16 is designed to engage the inner face of the flange 12 with the flange 15 resting on the upper edge of said flange 12.

The flange 15 is provided with an opening 17 for receiving a bolt 18 having a washer 19 and a sleeve 20. Said sleeve 20 is placed between the washer 19 and the upper face of the flange 15. The washer is larger in diameter than the sleeve so that an annular groove 21 is formed between the said washer and the top face of the flange 15.

The bolt 18 is also provided with a sleeve 22 having its upper end adjacent to the under face of the flange 15, and projecting downwardly near the outer face of the flange 12 and terminating near the lower edge of said flange. The bolt 18 is also provided with a clamp plate 23, having one end supported adjacent to the under face of the web 11 and its other end adjacent to the lower end of the sleeve 22. A nut 24 is provided for clamping the members 23 and 14 into engagement with the flange 12.

Thus means is provided for firmly clamping the sleeve 20 to the flange 12, and at the same time providing means whereby the sleeve 20 may be moved longitudinally of the flange if so desired by loosening the nut 24.

Supported on the sleeve 20 in the annular groove 21 is a stop bar 25, having an elongated loop 26 at one end for receiving the sleeve 20, and its opposite end is provided with a downwardly extending portion 27. The bar 25 is of such length that the inner face of the member 27 may be placed against the outer face of the flange 12, opposite the one having the clamp 13. The outer end of the loop 26 rests against the collar 20 when the bar 25 is arranged transversely above and with the flanges 12.

Thus means is provided for stopping the automobile wheel within the runways from movement in either direction. It will readily be seen that if the wheel engages said stop bar, the member 27 would have a tendency to swing in an arc of a circle from the center of the bolt 18. Inasmuch as the back of the loop 26 engages the sleeve 20, this circular movement of the member 27 would tend to cause the said member 27 to grip the outer face of the flange 12 and to rigidly support the stop bar against swinging action in either direction.

The sleeve 20 is of a length greater than the diameter of the bar 25 so that the free end of said bar 25 may be swung upwardly sufficiently to permit the lower end of the member 27 to clear the upper ends of the flange 12 and to permit the said bar to be swung to a position parallel with the flange 12, to which the clamp is connected, and to permit the automobile wheels to be moved into or out of position in the runways.

It sometimes happens, however. in certain types of trucks, that brace rods or other mechanism interfere with the placing of the stop bar in a position as indicated in Figure 1, and as above described, for locking the same, in which case the stop bar may be placed in the dotted line position shown in Figure 1, with the member 27 engaging the inner face of its coacting flange 12. This will then force the inner end of the slot 26 against the sleeve 20, with the said stop bar in the angular position shown by dotted lines. If the wheel negages the angle bar in a direction indicated by the arrow, then it will readily be seen that the bar will firmly support the wheel against movement in that direction. If the movement of the wheel is in the opposite direction, and from the opposite side of the stop bar, then the said stop bar may be placed on the opposite side of the transverse center line extending through the bolt 18.

Thus I have provided a stop of simple, durable and inexpensive construction, which may be easily and quickly applied to the runway without the use of tools other than a wrench, or without altering the runway.

Further I have provided a stop device adapted to be used in connection with either the front or rear wheels, and on either side of the runway or on either one of the runways of the automobile lift, thus providing one form of stop which is adapted to operate in any of the desired positions without having to provide two or more different types of stops, and thereby providing a stop in which the cost of manufacture is considerably reduced.

I claim as my invention:

1. In combination with a runway having spaced upwardly extending longitudinal flanges, a clamp device adjustably mounted longitudinally of one of said flanges having an upwardly extending member, and a stop bar having an elongated loop at one end slidably and rotatively supported on said upwardly extending member, the free end of said stop bar having a downwardly extending portion adapted to engage either the inner or outer face of the opposite flange from the one on which the clamp is supported for supporting said stop bar against lateral movement.

2. In combination, a runway having the form of a channel having upwardly projecting flanges, a clamp device detachably and adjustably secured adjacent to the outer face of one of said flanges, a stop bar slidably and pivotally connected to the upper end of said stop bar and designed to be supported transversely across the upper edge of said flanges, and means for securing the free end of said stop bar to the opposite flange from the one on which the clamp is supported.

3. In combination with a runway comprising a bottom member and an upwardly extending flange at each edge, an angle iron having one face supported adjacent to the inner face of one of said flanges and one portion extending laterally and outwardly from the upper edge of said flange, a vertical bolt extending through the last said flange having a sleeve extending upwardly and downwardly from said flange, a clamp plate on the lower end of said bolt having one end designed to engage the under surface of said runway, a washer on the upper end of the upper sleeve of larger diameter than the sleeve to form an annular groove between itself and the laterally extending member of the angle, a stop bar supported transversely across the upper edges of said flanges having a slot supported on said upper sleeve and in said annular groove, the free end of said stop bar being provided with a downwardly extending portion designed to engage either the inner or outer face of the opposite flange from which the angle member is supported, and a nut for one end of said bolt.

4. In a device of the class described, a clamp device adapted to be detachably and adjustably mounted to one side of a runway, said clamp including an upwardly projecting portion having an annular groove, a stop bar having one end provided with a downwardly extending portion and its opposite end with an elongated loop to operate in said annular groove.

5. In a device of the class described, a clamp device adapted to be detachably and adjustably mounted to one side of a runway, said clamp including an upwardly projecting portion having an annular groove, a stop bar having one end provided with a downwardly extending portion and its opposite end with an elongated loop to operate in said annular groove, the width of said groove being greater than the thickness of the slotted portion of said stop bar.

6. In a device of the class described, a clamp adapted to be detachably and adjustably mounted on one side of a runway, a stop bar having one end provided with a downwardly extending portion, and means for pivotally and slidably connecting the opposite end of said bar to said clamp.

7. In a device of the class described, the combination of a runway having upwardly projecting flanges, a clamp device mounted to move longitudinally of one of said flanges, a stop bar, means for pivotally and slidably connecting one end of said stop bar to said clamp, and means for anchoring the opposite end of said bar to the other one of said flanges.

8. In a device of the class described, the combination of a runway having upwardly projecting flanges, a clamp device supported by one of said flanges, a stop bar adapted to be moved to position transversely over said flanges, means for pivotally mounting one end of said stop bar to said clamp, and means for detachably fixing the free end of said bar against movement longitudinally of said runway.

Des Moines, Iowa, June 13, 1929.

CYRUS J. BRISTOL.